United States Patent
Johnson et al.

(10) Patent No.: US 8,117,108 B2
(45) Date of Patent: Feb. 14, 2012

(54) PROXIES FOR ACTIVELY MANAGED FUNDS

(75) Inventors: Ian P. Johnson, Westborough, MA (US); Stuart Evan Fross, Concord, MA (US); Ralph Joseph Wolf, Lunenburg, MA (US); Brian Walters, Holliston, MA (US)

(73) Assignee: FMR LLC, Boston, MA (US)

( * ) Notice: Subject to any disclaimer, the term of this patent is extended or adjusted under 35 U.S.C. 154(b) by 705 days.

(21) Appl. No.: 11/449,954

(22) Filed: Jun. 9, 2006

(65) Prior Publication Data
US 2007/0294161 A1 Dec. 20, 2007

(51) Int. Cl.
*G06Q 40/00* (2006.01)
(52) U.S. Cl. ............... 705/37; 705/36 R; 705/26.35; 705/38; 705/32; 705/80
(58) Field of Classification Search ............ 705/1, 37, 705/1.1, 36 R, 26.35, 4, 80, 321, 30, 38, 5, 705/6, 75, 50; 715/810; 235/379
See application file for complete search history.

(56) References Cited

U.S. PATENT DOCUMENTS

| | | | |
|---|---|---|---|
| 6,338,047 B1 * | 1/2002 | Wallman | 705/36 R |
| 6,941,580 B2 | 9/2005 | Gastineau et al. | |
| 7,099,838 B1 * | 8/2006 | Gastineau et al. | 705/35 |
| 7,305,362 B2 | 12/2007 | Weber et al. | |
| 7,444,300 B1 | 10/2008 | Broms et al. | |
| 7,496,531 B1 | 2/2009 | Gastineau et al. | |
| 7,526,445 B2 | 4/2009 | MacQueen et al. | |
| 7,571,130 B2 | 8/2009 | Weber et al. | |
| 7,689,501 B1 | 3/2010 | Gastineau et al. | |
| 2001/0025266 A1 | 9/2001 | Gastineau et al. | |
| 2002/0059126 A1 * | 5/2002 | Ricciardi | 705/36 |
| 2002/0128947 A1 | 9/2002 | Sauter et al. | |
| 2003/0144947 A1 | 7/2003 | Payne | |
| 2003/0233302 A1 | 12/2003 | Weber et al. | |
| 2004/0186803 A1 | 9/2004 | Weber et al. | |
| 2004/0210502 A1 | 10/2004 | Madhavan et al. | |
| 2005/0038725 A1 | 2/2005 | Boyle et al. | |
| 2005/0060254 A1 * | 3/2005 | Jones | 705/36 |
| 2005/0080734 A1 | 4/2005 | Lynch et al. | |
| 2005/0216407 A1 | 9/2005 | Feldman et al. | |

(Continued)

FOREIGN PATENT DOCUMENTS
WO WO02/29692 A1 4/2002

OTHER PUBLICATIONS

SEC Concept Release: "Actively Managed Exchange—Traded Funds" Securities and Exchange Commission, Jonathan G. Katz, Date: Nov. 8, 2001.*

(Continued)

*Primary Examiner* — Ella Colbert
*Assistant Examiner* — John H Holly
(74) *Attorney, Agent, or Firm* — Fish & Richardson P.C.

(57) ABSTRACT

Among other things, receiving public information about an actively managed fund, selecting a group of financial assets, determining a group of weights corresponding to the group of financial assets thereby determining a weighted group of financial assets, the weights being determined based only on the public information, and publishing the contents of the weighted group of financial assets, wherein an expected valuation of the weighted group of financial assets is within a threshold percentage of an expected valuation of the actively managed fund.

37 Claims, 3 Drawing Sheets

U.S. PATENT DOCUMENTS

2008/0177676 A1     7/2008   Weber et al.
2009/0043713 A1     2/2009   Weber et al.

OTHER PUBLICATIONS

SEC Concept Release: "Actively Managed Exchange—Traded Funds" Securities and Exchange Commission, Jonathan G. Katz, Date: Nov. 8, 2001.*

International Search Report dated Feb. 21, 2008; Searching Authority: U.S.; Search conducted by Lee W. Young.

Securities-and-Exchange-Commission, "SEC Concept Release: Actively Managed Exchange-Traded Funds", May 18, 2004 (28 pages).

(Nuveen) Gary L. Gastineau, "Re: Actively-Managed Exchange-Traded Funds", Jan. 14, 2002 (38 pages).

Federal Register: Mar. 8, 2004 (vol. 69, No. 45) (6 pages).

Equity Securities Qualification, "First Trust Dow Jones Select MicroCap Index Fund", Nov. 30, 2005 (6 pages).

Investment Company Act of 1940, Section 4, The University of Cincinnati College of Law (1 page).

PR Newswire, "Integrity Life Insurance Company First to Combine ETFs and Variable Annuities", Feb. 3, 2005 (2 pages).

Nina Mehta, "Getting Saved on Wall Street: ETFs: A New Religion is Ten-Years Old", *Traders Magazine*, Dec. 1, 2002 (1 page).

Morgan Stanley & Co. Incorporated; Letter to Jonathan G. Katz, dated May 3, 2002, published on or before Feb. 24, 2005 on http://www.sec.gov/rules/concepts/s72001/johnson1.htm (11 pages).

Eurekahedge, Hedge Fund Monthly, "The Benefits of Master-Feeder Fund Structures for Asian-based Hedge Fund managers", http://www.eurekahedge.com/news/04apr_archive_Siciley_master_feeder.asp, Apr. 2004 (4 pages).

* cited by examiner

PROXIES FOR ACTIVELY MANAGED FUNDS

BACKGROUND

A mutual fund is an open-end investment company that holds a portfolio of securities. An investor may invest in an undivided interest in the portfolio by buying shares of the mutual fund. The mutual fund can be actively managed by a manager or a group of managers. The management uses its collective judgment in deciding which securities to include in the mutual fund's portfolio from day to day. In this case, the management is typically under a fiduciary duty to keep confidential the actual portfolio of securities held by the fund, except possibly in circumstances disclosed in the fund's prospectus.

An exchange-traded fund ("ETF") is a type of fund that can share characteristics of both mutual funds and other exchange-traded assets like stocks. Like a mutual fund, an ETF can derive its value from a portfolio of securities. In particular, an ETF may derive its value from the portfolio of securities held by a mutual fund. In this case, the mutual fund is said to be the "underlying fund" of the ETF. Like other exchange-traded assets (and unlike a mutual fund), an ETF can be traded on a secondary market, such as on an exchange or over the counter.

SUMMARY

In general, in one aspect, receiving public information about an actively managed fund; selecting a group of financial assets; determining a group of weights corresponding to the group of financial assets, thereby determining a weighted group of financial assets, the weights being determined based only on the public information; and publishing the contents of the weighted group of financial assets; wherein an expected valuation of the weighted group of financial assets is within a threshold percentage of an expected valuation of the actively managed fund.

Implementations may include one or more of the following features. The actively managed fund includes a mutual fund. The actively managed fund includes an exchange-traded fund. The actively managed fund comprise a commingled pool. Receiving public information consists of receiving returns data of the actively managed fund. Selecting the group of financial assets includes selecting between 2 and 20 financial assets. Selecting a group of financial assets includes selecting one or more securities. Selecting a group of financial assets includes selecting one or more commodities. Selecting a group of financial assets includes selecting one or more listed commodities pools. Selecting a group of financial assets includes selecting one or more listed commodities funds. Selecting a group of financial assets includes selecting one or more exchange-traded funds. Determining the group of weights includes receiving public information about the group of financial assets, and the group of weights are determined based on the received public information about the group of financial assets. Determining the group of weights includes determining a group of weights each greater than 0. The threshold percentage is determined to comply with a market requirement established by the market or a regulator of the market. The threshold percentage is 2%. The expected valuation includes expected value. A daily tracking error of the weighted group of financial assets relative to the actively managed fund is below a pre-defined threshold value. The threshold value is less than or equal to 0.005.

Certain implementations may have one or more of the following advantages. The weighted group of financial assets is relatively easy to gather or transact in. The weighted group of financial assets typically need only be updated approximately once every five business days.

DESCRIPTION

Figure 1:
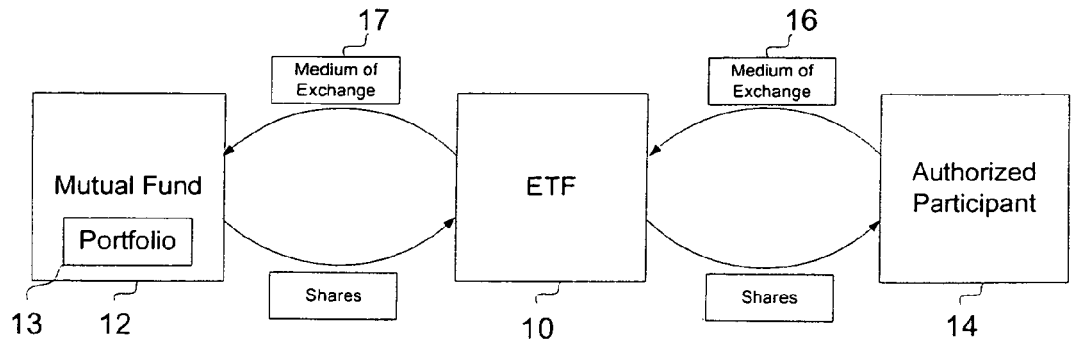
FIG. 1 is a schematic depiction of transactions between an authorized participant, an ETF, and a mutual fund.

Referring to FIG. 1, an ETF 10 transacts with its underlying mutual fund 12 by transferring a medium exchange 17 to the mutual fund 12, and receiving shares of the mutual fund 12 in return. Additionally, the ETF 10 sells its own shares in other transactions using another medium of exchange 16. For example, U.S. patent application Ser. No. 11/401,497, filed on Apr. 7, 2006, entitled "CREATING OR REDEEMING SHARES OF AN EXCHANGE TRADED FUND," the entire contents of which are incorporated by reference herein, describes implementations of such transactions. The value of the shares of the mutual fund 12 and the ETF 10 are based at least partially on the mutual fund's portfolio of securities 13. Often, the ETF 10 only transacts directly with investors who are authorized participants 14. An authorized participant 14 is an entity chosen by the ETF 10 to undertake the responsibility of obtaining the assets needed to buy shares of the ETF 10. Authorized participants 14 also may make markets in the ETF shares for their own account, or may act as agent or principal with respect to transactions on behalf of their customers. In principle, any entity can be an authorized participant 14, but typically authorized participants are large institutional organizations, for example, market makers or specialists who have obtained the requisite regulatory approval to act in one or both of these capacities.

The net asset value ("NAV") of a fund is one valuation of the fund that determines the price investors pay for shares of the fund. The fund's NAV is defined as the fund's total assets minus total liabilities divided by the number of outstanding shares. For a mutual fund 12, the NAV is typically calculated and published at regular intervals, for example once per business day. Therefore the price of mutual fund shares typically does not change intra-day. An order to purchase or redeem shares of a mutual fund 12 is processed at the mutual fund's next-calculated NAV. Since a substantial portion of the mutual fund's assets typically arise from its portfolio of securities 13, changes in the portfolio's value (which can occur intra-day) impact the mutual fund's NAV, and therefore the price of shares of the mutual fund.

An ETF 10 transacts with an authorized participant 14 who desires to buy or redeem shares of the ETF 10. For example, FIG. 1 shows an authorized participant 14 buying shares of the ETF 10. Transactions between the ETF 10 and the authorized participant take place using a pre-determined medium of exchange 16. The pre-determined medium of exchange 16 can be money, securities or other financial assets, or a combination of these. When the medium of exchange 16 includes securities or non-money assets, the securities and non-money assets are typically identified in definite proportions and the transaction is said to be "in-kind." For in-kind transactions, the medium of exchange 16 is referred to as a "creation basket." Some authorized participants 14 prefer to transact in-kind because they typically hold more securities than money. As used herein, "money" is not limited to a particular country's currency. For example, "money" can refer to U.S. Dollars, Euros, Yen, other currency, or combinations of these.

Transacting in-kind also allows the definition of a medium of exchange 16 whose value is correlated with the NAV (or other suitable valuation) of the mutual fund 12 or the ETF 10. (Such a correlation is often difficult when transacting using only money, because a fixed amount of money does not change, while securities or the NAV of a mutual fund 12 or ETF 10 typically changes with time.) Selecting a medium of exchange 16 to have a value correlated to the NAV of the mutual fund 12 or the ETF 10 is sometimes necessary for the ETF's regulatory compliance.

Among other regulatory entities world-wide, the United States Securities and Exchange Commission ("SEC") takes the position that a relatively small difference between the NAV of an ETF 10 and the secondary market price of the ETF 10 is a desirable property indicative of fairness to ETF investors. To promote investor fairness, the SEC has established standards requiring that this difference, referred to as the "spread" between the ETF 10 and the mutual fund 12, approximate the mutual fund's NAV.

Correlating the value of the creation basket to the NAV (or other suitable valuation) of the mutual fund 12 or the ETF 10 helps keep the spread relatively low, by making the following financial maneuver available to an authorized participant 14. As used herein, a valuation is "suitable" if correlating the value of the creation basket and the valuation of mutual fund 12 or ETF 10 makes the following spread-reducing maneuver available:

Suppose an authorized participant 14 correctly deduces a relatively large spread at a certain time during the day. Suppose, for example, that the authorized participant 14 correctly deduces that, at noon, the price of ETF shares is less than the NAV of the mutual fund 12. In this situation, the authorized participant 14 can simultaneously initiate two transactions: (1) place a large order for the ETF shares and (2) short-sell the securities that comprise the creation basket, in the proportions that they appear in the creation basket. Note that the large order of ETF shares tends to drive the price of the ETF up, thereby decreasing the spread.

At the end of the day, the authorized participant 14 redeems the ETF shares for a profit. To see that the authorized participant 14 actually profits, consider two cases. If the NAV of the mutual fund 12 does not change between noon and when the ETF shares are redeemed, the authorized participant 14 will profit on transaction (1), because of the spread. Furthermore, the authorized participant 14 will break even on transaction (2), since the value of creation basket is correlated to the NAV of the mutual fund 12 or the ETF 10, which we have assumed not to change in this case. Therefore, the two transactions result in a net profit for the authorized participant 14.

In the case that the next-calculated NAV does change from when it was estimated, then the profitability of the two transactions will be equally and oppositely affected. If the NAV of the mutual fund 12 or the ETF 10 increases, for example, the short-sell will become less profitable by the amount of the NAV's increase, but the ETF redemption will be more profitable by this amount. Thus, in this situation also results in a net profit for the authorized participant 14.

The correlation between the value of the creation basket and the NAV (or other suitable valuation) of the mutual fund 12 or the ETF 10 helps make these spread-narrowing maneuvers profitable for authorized participant 14. Furthermore, a relatively narrow spread is often desirable because such a spread tends to reduce the cost of buying or selling the ETF 10 in the secondary market, which in turn tends to make the ETF 10 a more attractive investment and encourages sales of its shares. Thus, it is often desirable for authorized participants 14 and fund managers alike to use a medium of exchange 16 that includes securities whose value is, in aggregate, correlated to the NAV of the mutual fund 12 or the ETF 10.

One candidate for such a medium of exchange 16 is the mutual fund's portfolio of securities 13. Indeed, since the mutual fund 12 derives its value from its portfolio of securities 13, and the ETF 10 derives its value from its underlying mutual fund 12, the value of the portfolio of securities 13 is essentially perfectly correlated to the mutual fund's or the ETF's NAV. However, if the mutual fund 12 is actively managed, the composition of the portfolio of securities 13 is intellectual property of the mutual fund 12 held in a fiduciary capacity by the fund management, and typically cannot be disseminated to the public to be used as a medium of exchange. Typically, in the case of an actively managed fund, the content of some of the fund's holdings is held in a confidential capacity by the fund's management. As used herein, a fund (not necessarily a mutual fund) is considered to be an "actively managed fund" if it does not seek to track the return of a particular index by replicating or sampling index securities. An actively managed fund's management could select investments consistent with the fund's investment objectives and policies without reference to the composition of an index.

If a non-investor in the mutual fund 12 knew the contents of the fund's portfolio of securities 13, for example, the non-investor could adjust his investments to mimic that of the portfolio of securities 13. By doing so, the non-investor obtains the benefit of the fund management's collective judgment, but does not have to pay the fees associated with being an investor. This situation is an example of "free riding."

Similarly, if a non-investor in the mutual fund 12 knew the contents of the fund's portfolio of securities 13, over time, the non-investor may notice trends in how the fund's portfolio of securities 13 changes. For example, the non-investor may notice the mutual fund 12 buying large amounts of a particular stock. The non-investor may account for the mutual fund's behavior in determining his own investment strategy. For example, the non-investor may acquire or hold the particular stock, while the mutual fund's activity drives the price of the stock up. This situation is an example of the non-investor "front running" the mutual fund 12.

To avoid free riding, front running, and other undesirable scenarios, the actively managed mutual fund's management is typically under a duty not to disclose the contents of the portfolio of securities 13, for example when the mutual fund 12 has a policy forbidding such disclosures. Instead of publishing the contents of the portfolio of securities 13, a "proxy" portfolio can be published and used as a medium of exchange 16. A proxy portfolio is a portfolio which is different from the fund's portfolio of securities 13, yet is sufficiently correlated to the mutual fund 12 to be used as a medium of exchange 16. When used as a medium of exchange 16, the proxy portfolio is also called a proxy basket.

One previously-employed approach to creating a proxy basket is to calculate and publish certain features of the portfolio of securities 13, based on knowing the composition of the portfolio of securities 13. For example, one approach involved calculating and publishing the portfolio's exposure to pre-defined economic risk factors. If enough of these exposures are published, then this approach provides enough information to construct a proxy basket, but not enough information to deduce the composition of the portfolio.

However, a drawback to this approach is that publishing features of the portfolio of securities 13 may allow a certain amount of free riding or front running, in the sense that the public knows more about the portfolio of securities 13 after the mutual fund 12 publishes the features than the public knew before publication. Even if it is not immediately clear how the published information can be used for free riding, the fact that the public's knowledge of the fund's portfolio of securities 13 is increased can be undesirable in some circumstances.

The approach described below allows the creation of a proxy basket that can be used as a medium of exchange 16, and is determined based only on public information about the fund. As used herein, "public information" about an actively managed fund is any information that is not held by the fund's management in a fiduciary capacity, for example information that a mutual fund is required by law to disclose to the public, or any information that the public may deduce about the fund based on public disclosures of the mutual fund. Obligations "required by law" exclude obligations that arise solely from agreements among private parties. Further examples of public information typically include the current net asset value of a mutual fund 12, and the current returns of its portfolio of securities 13. Examples of non-public information typically include current exposure of the fund to economic risk factors or other current risk characteristics of the fund, current exposure of the fund to industry sectors, the types of securities current held by the fund, or other features of the fund which can only be calculated by knowing the composition of the fund's holdings, a partial composition of the fund's holdings, or whether a particular security is in the fund's holdings.

Information that is non-public on one day may become public another day. For example, the composition of a mutual fund's portfolio of securities 13 from a relatively long time in the past generally cannot be used for free-riding, front-running, or other ways that are unfair to the fund's investors. The time at which information is being used is pertinent to the inquiry of whether the information constitutes "public information."

Figure 2:
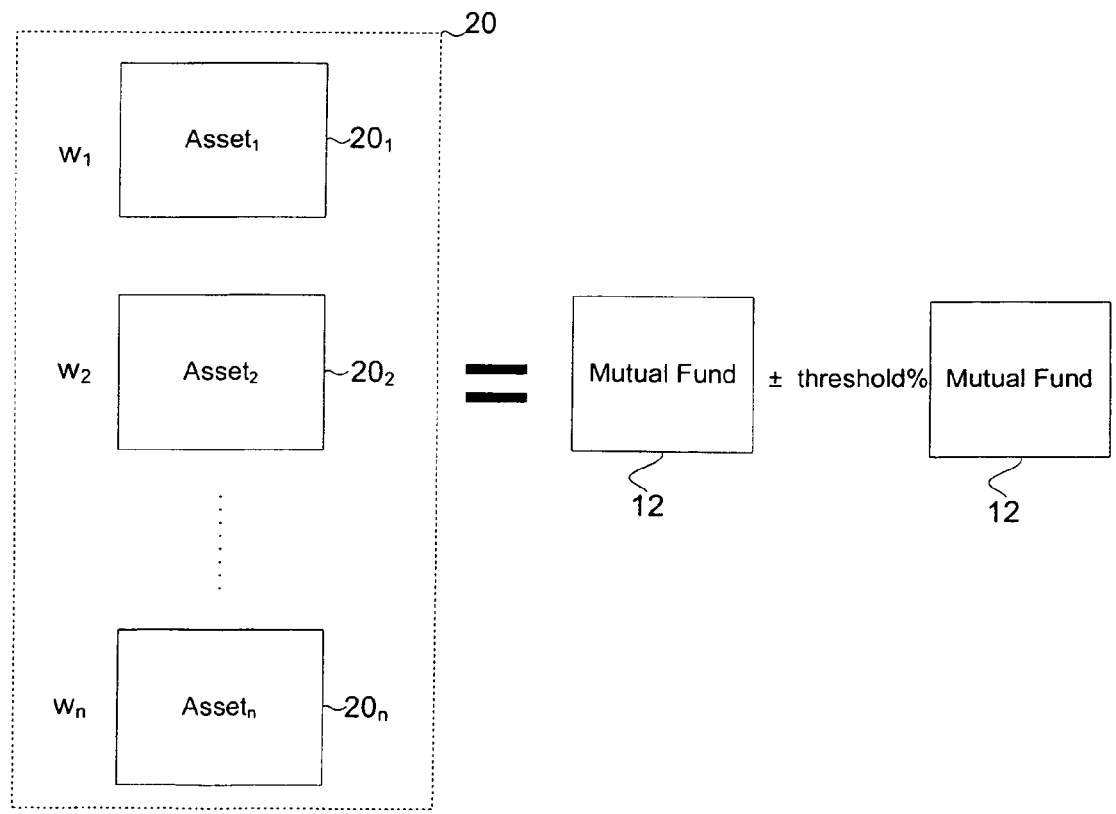
FIG. 2 is a schematic depiction of a proxy basket.

Referring to FIG. 2, the proxy basket 20 is a weighted group of a pre-selected number n of basis financial assets $20_1$, $20_2$, ..., $20_n$. The basis financial assets $20_1$, ..., $20_n$ appear in the proxy basket 20 with pre-selected proportions determined by their weights. The basis financial asset $20_i$ appears in the proxy basket 20 with weight $w_i$ for $1 \leq i \leq n$. The weights $\{w_i\}$ may take any real value, including negative values. A negative weight $w_i$ represents a "short" position on the financial asset $20_i$. For calculational convenience, the weights may be normalized so that their absolute values sum to 1, but this is not necessary.

In FIG. 2, the arithmetic operations shown are with respect to the values of the illustrated assets, not necessarily the assets themselves. Thus, the proxy basket 20 is chosen so that its value is within a threshold percentage of the value of the mutual fund 12, not necessarily that its composition is within a threshold percentage of the composition of the mutual fund 12. In some embodiments, the threshold percentage is chosen based on local securities regulations. For example, in some embodiments employed in the United States (and possibly elsewhere), the threshold percentage is less than or equal to 2%.

In principle, any number of financial assets $20_1$, ..., $20_n$, or as few as one basis asset $20_1$ can provide a desired correlation. In some embodiments, the proxy basket 20 consists of 5-20 basis financial assets $20_1$, ..., $20_n$. Generally, using relatively few basis financial assets $20_1$, ..., $20_n$ is desirable because of the fewer transactions (and lower transactions costs) associated with assembling the proxy basket 20.

The basis financial assets $20_1$, ... $20_n$ can be any type of asset that has a definite value that is a function of time. (The particular function need not be known, and may be constant). For example, the basis financial assets $20_1$, ..., $20_n$ can be securities or portfolios of securities, exchange-traded funds, hedge funds, derivatives, commodities futures, listed commodity pools, listed commodity funds, or other investment vehicles. The basis financial assets $20_1$, ..., $20_n$ need not be of the same type or traded on the same exchange. For example, one basis financial asset $20_1$ can be an ETF traded on a U.S. exchange, and another basis financial asset $20_2$ can be an ETF traded on a U.K. exchange.

Figure 3:
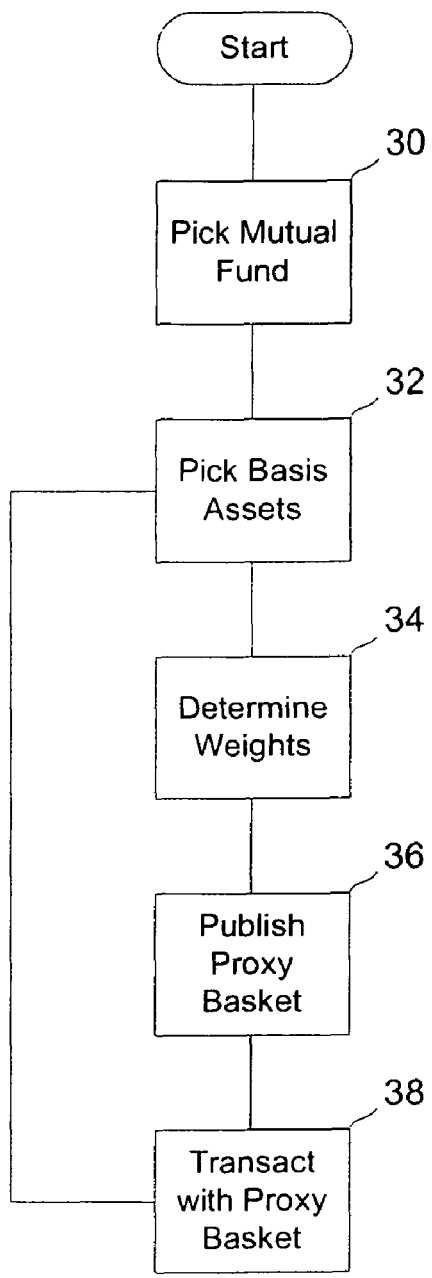
FIG. 3 is a flowchart for creating a proxy basket.

Referring to FIG. 3, the task of creating a proxy basket is undertaken with respect to a selected mutual fund 12 (step 30), and selected basis financial assets $20_1$, ..., $20_n$ (step 32).

In some embodiments, some or all of the basis financial assets $20_1$, ..., $20_n$ are selected so they bear a similarity to the mutual fund 12. For example, if it is publicly known that a substantial portion of the mutual fund's portfolio of securities 13 includes securities from a particular industry sector (e.g., the mutual fund 12 is marketed as focusing on that industry sector), then the financial assets $20_1$, ..., $20_n$ may be selected from that industry sector. Other similarities between the basis financial assets $20_1$, ..., $20_n$ and the mutual fund 12 may be arranged, so long as those similarities are determined using only public information about the mutual fund 12. Selecting the basis financial assets $20_1$, ..., $20_n$ to be similar to the mutual fund 12 may provide a stronger correlation of the proxy basket 20 to the mutual fund 12, but generally the basis financial assets $20_1$, ..., $20_n$ need not bear any similarity to the mutual fund 12.

Once the basis financial assets $20_1$, ..., $20_n$ are selected, their respective weights are determined (step 34), for example by performing the following calculations. Let $r_{1t}$, ..., $r_{nt}$ denote the respective daily total returns of the basis financial assets $20_1$, ..., $20_n$ at time t. In some embodiments, the basis financial assets $20_1$, ..., $20_n$ are chosen so that their returns $r_{1t}$, ..., $r_{nt}$ are linearly independent functions of time. The returns of the mutual fund 12 at time t is denoted $R_t$. The weights $w_1$, ..., $w_n$ are determined so that $$R_t \approx \sum_{i=1}^{n} w_i r_{it},$$

where the "≈" symbol indicates that the expression on the right-hand side of the "≈" symbol is numerically within a pre-selected threshold of the expression on the left-hand side.

This equation can be solved by several different techniques. For example, one technique employs multiple regression. To perform the multiple regression, some historical data about the returns of mutual fund 12 and the returns of the basis financial assets $20_1$, ..., $20_n$ is needed. The amount of historical data needed depends on how many basis financial assets $20_1$, ..., $20_n$ are selected, and how close a correlation is desired between the proxy basket 20 and the mutual fund 12. Often, knowing 5n days worth of returns data for the mutual fund 12 and the n basis financial assets $20_1$, ..., $20_n$ is sufficient to correlate the proxy basket 20 and the mutual fund 12 within 2%, although in some cases, less historical data may be sufficient to achieve a correlation within 2%.

To perform the regression, returns of the mutual fund 12 are modeled as:

$$R_t = \sum_{i=1}^{n} w_i r_{it} + \varepsilon_t,$$

where $\varepsilon_t$ is the error at time t. The weights $w_1$, ..., $w_n$ can be selected so that the integral of a non-negative function of $\varepsilon_t$ is minimized, for example, $\int \epsilon_t^2 \, dt$, where the integral ranges over the available historical data. In some embodiments, the weights are subject to the constraint that each weight $w_i$ is non-negative. This constraint results in a proxy basket 20 containing no "short" positions. Such a proxy basket 20 is desirable in some circumstances, because sometimes short positions are inconvenient for an authorized participant 14 to acquire or for an ETF 10 to accept as a medium of exchange.

Additionally, the proxy basket 20 can be used by the market as an intra-day estimate of the mutual fund's NAV. If $P_t$ is the price of the mutual fund 12 at time t, and $p_{it}$ is the price of the i-th basis financial asset $20_i$ at time t, then the mutual fund's estimated intra-day NAV is given by:

$$P_t = P_0 \left[ \sum_{i=1}^{n} w_i \left( \frac{p_{it}}{p_{i0}} \right) \right],$$

where $P_0$ and $p_{i0}$ denote the respective prices at the previous close of market.

In some embodiments, the proxy basket 20 may be further selected so that it has a small tracking error relative to the mutual fund 12, with "small" meaning less than a pre-determined threshold. In some embodiments, this threshold value is between 0.2% and 0.5%. Here, tracking error TE is defined to be the standard deviation of the mutual fund's estimated returns $R_{est}$ minus the mutual fund's actual returns $R_{act}$:

$$TE = \sigma(R_{est} - R_{act}).$$

Here an estimate of the mutual fund's estimated funds at time step m+1, based on m time steps (e.g., business days), is given by, $$R_{est} = \sum_{i=1}^{n} w_i r_{i, t=m+1}.$$

Choosing the weights $w_i$ so that the tracking error is small can be accomplished by maintaining a rolling estimate of the tracking error that is updated at regular intervals (e.g., once per business day), and using the rolling estimates to further constrain the choice of the weights in the multiple regression described above.

Once the weights are determined so that the proxy basket 20 is correlated to the mutual fund 12 within the desired threshold, the proxy basket 20 is published (step 36). As used herein, "publishing" the proxy basket 20 includes making the contents of the proxy basket known to the potential purchasers of shares of the ETF 10. For example, the contents of the proxy basket 20 can be posted in a publicly accessible forum such as a newspaper or a web page. Additionally, some authorized participants 14 may be directly contacted, for example by an electronic communication, and informed of the contents of the proxy basket 20.

The now-published proxy basket 20 can be used as a medium of exchange 16 (step 38). For example, the ETF 10 can accept the proxy basket 20 in exchange for ETF shares, or can deliver the proxy basket 20 to an authorized participant 14 who is redeeming ETF shares.

As new returns data becomes available about the mutual fund 12 or the basis financial assets $20_1, \ldots, 20_n$, the above-described process can be repeated at regular intervals (e.g., once every business day,) using the new data. However, it has been observed that repeating the process as little as approximately once every five business days still provides a proxy basket 20 suitable to be used as a medium of exchange 16. This robustness is desirable, for example, if market data becomes unavailable due to a technical error. For a given mutual fund 12, the repetition of the process can go as far back as selecting a new set of basis financial assets $20_1, \ldots, 20_n$. Alternatively, weights may be re-calculated using the same basis financial assets $20_1, \ldots, 20_n$.

Figure 4:
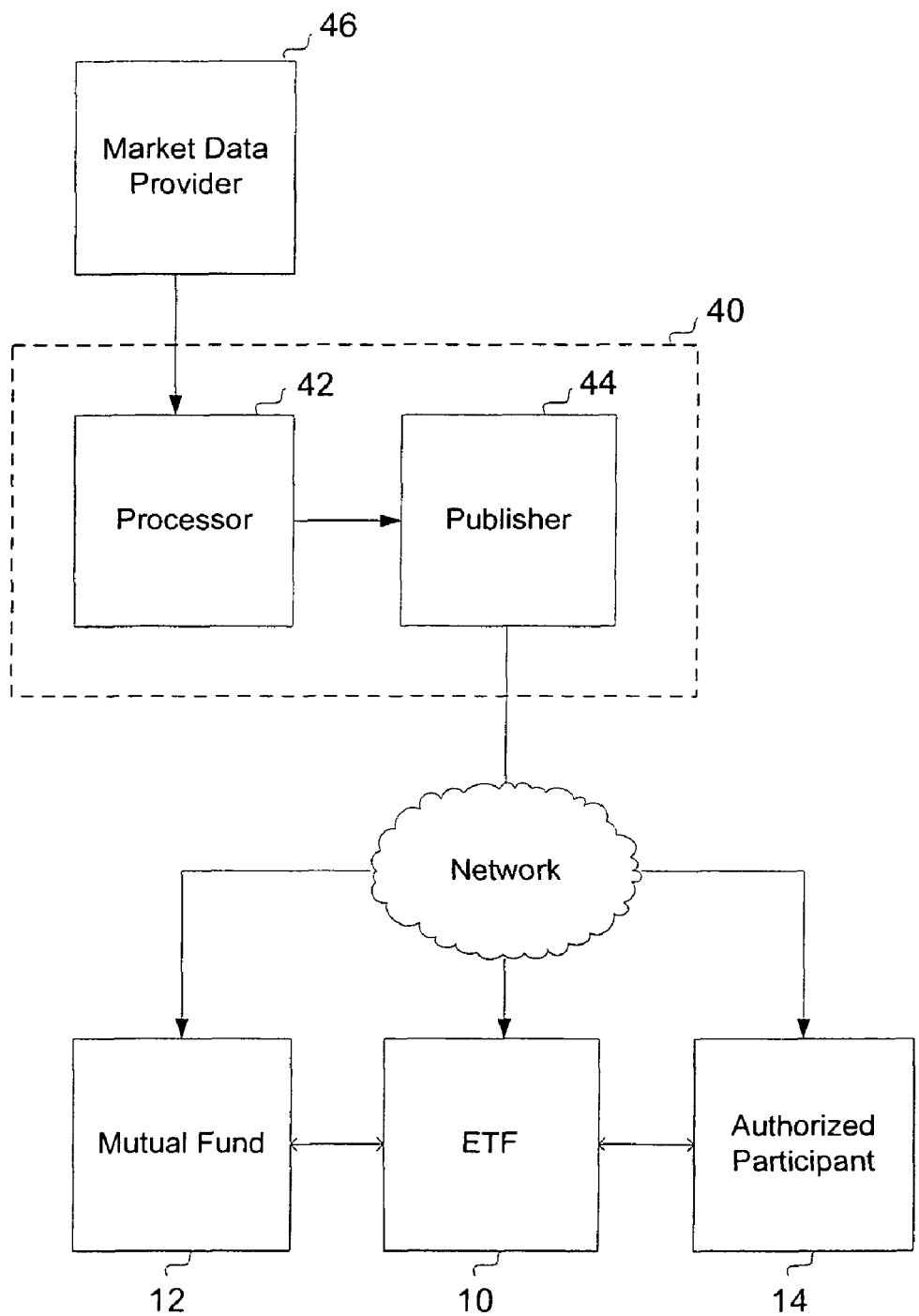
FIG. 4 is schematic depiction of a proxy determination system.

Referring to FIG. 4, a proxy determination system 40 includes a processor 42 and a publisher 44. The processor 42 is in data communication with one or more market data providers 46, each of which supplies publicly available market data (e.g., returns data for the mutual fund 12 and the basis financial assets $20_1, \ldots, 20_n$) to the processor 42. The processor determines a proxy basket 20 using the returns data, and passes the composition of the proxy basket 20 to the publisher 44. The publisher 44 publishes the composition of the proxy basket 20 to various entities, for example the ETF 10, the mutual fund 12, or authorized participants 14.

The processor 42 and publisher 44 may be hardware, software, or a combination of hardware and software. For example, the processor 42 and the publisher 44 may include computer-readable instructions stored on an information storage medium such as a magnetic or optical disk. Additionally or alternatively, the processor 42 may include a microprocessor configured to use the market data to compute the composition of the proxy basket 20, and the publisher 44 may include a microprocessor configured to receive the composition of the proxy basket 20 and cause it to be published.

The above description of the proxy basket 20 was in relation to the ETF 10 and an underlying actively managed mutual fund 12. However, constructing the proxy basket 20 only made use of the fact that the mutual fund 12 has a well-defined value. Thus, a proxy basket 20 could be constructed as described above for an ETF that derives its value from a financial asset or assets other than a mutual fund, such as hedge funds, derivatives, commodities futures, commingled pools, listed commodity pools, listed commodities funds, or other investment vehicles.

Other embodiments are within the scope of the following claims.

What is claimed is:

1. A computer-implemented method comprising:
   receiving, by a microprocessor, public information about an actively managed fund;
   selecting a group of financial assets for a proxy creation unit;
   determining, by the microprocessor, a group of weights for assets in the group of financial assets, the weights being determined by executing an algorithm that uses only public, information of the actively managed fund, and which excludes information that reveals risk exposure of a current composition of an actual creation unit of the actively managed fund, and with the weights determined based on the public information to minimize tracking error between an expected valuation for the proxy creation unit and an expected valuation of an actively managed fund with the expected valuation for the proxy creation unit being within a threshold percentage of the expected valuation of the actual creation unit of the actively managed fund based on the actual assets in the fund; and
   disseminating an electronic communication to publish the contents of the group of financial assets and the determined weights.

2. The method of claim 1 wherein the public information is publicly available investment returns data of the actively managed fund.

3. The method of claim 1 wherein selecting the group of financial assets comprises selecting between 2 and 20 financial assets.

4. The method of claim 1 wherein selecting a group of financial assets comprises selecting one or more securities.

5. The method of claim 1 wherein selecting a group of financial assets comprises selecting one or more commodities.

6. The method of claim 1 wherein selecting a group of financial assets comprises selecting one or more listed commodities pools.

7. The method of claim 1 wherein selecting a group of financial assets comprises selecting one or more listed commodities funds.

8. The method of claim 1 wherein selecting a group of financial assets comprises selecting one or more exchange-traded funds.

9. The method of claim 1 wherein using the microprocessor to determine the group of weights includes receiving public information about the group of financial assets, the group of weights being determined based on the received public information about the group of financial assets.

10. The method of claim 1 wherein the microprocessor determines the group of weights with weight being greater than zero indicating that the proxy creation unit holds long positions in the corresponding securities and with weights being less than zero indicating that the proxy creation unit holds short positions in the corresponding securities.

11. The method of claim 1 wherein the threshold percentage is determined to comply with a requirement established by a market or a regulator of the market.

12. The method of claim 11 wherein the threshold percentage is 2%.

13. The method of claim 1 wherein the expected valuation comprises an expected value.

14. The method of claim 1 wherein a daily tracking error of the weighted group of financial assets relative to the actively managed fund is below a pre-defined threshold value.

15. The method of claim 14 wherein the pre-defined threshold value is less than or equal to 0.005.

16. The method of claim 1, wherein disseminating to the public the contents of the weighted group of financial assets comprises posting the contents of the weighted group of financial assets in a publicly accessible forum.

17. A computer program product tangibly embodied on a computer readable storage device, the computer program product comprising instructions for causing a computer to:
receive public information about an actively managed fund;
select a group of financial assets for a proxy creation unit, the group of financial assets including exchange-traded funds;
execute an algorithm that uses only public, information of the actively managed fund, and which excludes information that reveals risk exposure of a current composition of an actual creation unit of the actively managed fund to determine a group of weights for assets in the group of financial assets, the weights being determined based on the public information to minimize tracking error between an expected valuation for the proxy creation unit and an expected valuation of an actively managed fund with the expected valuation for the proxy creation unit being within a threshold percentage of the expected valuation of an actual creation unit of the actively managed fund based on the actual assets in the fund; and
disseminate in an electronic communication the contents of the group of financial assets and the determined weights.

18. The storage device of claim 17, wherein the instructions for causing the computer to receive public information consist of causing the computer to receive publicly available investment returns data of the actively managed fund.

19. The storage device of claim 17, wherein the instructions for causing the computer to select a group of financial assets comprise instructions for causing the computer to select between 2 and 20 financial assets.

20. The storage device of claim 17, wherein the instructions for causing the computer to select a group of financial assets comprise instructions for causing the computer to select one or more securities.

21. The storage device of claim 17, wherein the instructions for causing the computer to select a group of financial assets comprise instructions for causing the computer to select one or more commodities.

22. The storage device of claim 17, wherein the instructions for causing the computer to select a group of financial assets comprise instructions for causing the computer to select one or more listed commodities pools.

23. The storage device of claim 17, wherein the instructions for causing the computer to select a group of financial assets comprise instructions for causing the computer to select one or more listed commodities funds.

24. The storage device of claim 17, wherein the instructions for causing the computer to select a group of financial assets comprise instructions for causing the computer to select one or more exchange-traded funds.

25. The storage device of claim 17, wherein the instructions for causing the computer to determine a group of weights corresponding to the group of financial assets include instructions for causing the computer to receive public information about the group of financial assets, and to determine the group of weights based on the received public information about the group of financial assets.

26. The storage device of claim 17, wherein the instructions to determine the group of weights with weight being greater than zero indicating that the proxy creation unit holds long positions in the corresponding securities and with weight being less than zero indicating that the proxy creation unit holds short positions in the corresponding securities.

27. The storage device of claim 17, wherein the threshold percentage is determined to comply with a requirement established by a market or a regulator of the market.

28. The storage device of claim 27 wherein the threshold percentage is 2%.

29. The storage device of claim 17, wherein the expected valuation comprises an expected value.

30. The storage device of claim 17, wherein the instructions also cause the computer to determine the group of weights such that a daily tracking error of the weighted group of financial assets relative to the actively managed fund is below a pre-defined threshold value.

31. The storage device claim 30 wherein the pre-defined threshold value is less than or equal to 0.005.

32. A system comprises:
one or more computer systems, each comprising:
one or more processors; and
memory; and
a readable storage device, storing a computer program product, the computer program product comprising instructions to cause the one or more processors to:
receive public information about an actively managed fund;

select a group of financial assets for a proxy creation unit, the group of financial assets including exchange-traded funds;

execute an algorithm that uses public, information of actively managed fund, and which excludes information that reveals risk exposure of a current composition of an actual creation unit of the actively managed fund, to determine a group of weights for assets in the group of financial assets, the weights being determined based on the public information to minimize tracking error between an expected valuation for the proxy creation unit and an expected valuation of an actively managed fund with the expected valuation for the proxy creation unit being within a threshold percentage of the expected valuation of an actual creation unit of the actively managed fund based on the actual assets in the fund; and disseminate in an electronic communication the contents of the group of financial assets and the determined weights.

33. The system of claim 32 wherein the instructions for causing the processor to receive public information consist of causing the processor to receive publicly available investment returns data of the actively managed fund.

34. The system of claim 32 wherein the instructions for causing the processor to select a group of financial assets comprise instructions for causing the processor to select between 2 and 20 financial assets.

35. The system of claim 32 wherein the instructions for causing the processor to select a group of financial assets comprise instructions for causing the processor to select one or more exchange-traded funds.

36. The system of claim 32 wherein the instructions for causing the processor to determine a group of weights corresponding to the group of financial assets include instructions for causing the processor to receive public information about the group of financial assets, and to determine the group of weights based on the received public information about the group of financial assets.

37. The system of claim 32 wherein the instructions for causing the processor to determine the group of weights with weights being greater than 0 indicating that the proxy creation unit holds long positions in the corresponding securities and with weights being less than 0 indicating that the proxy creation unit holds short positions in the corresponding securities.

* * * * *

UNITED STATES PATENT AND TRADEMARK OFFICE
CERTIFICATE OF CORRECTION

| | | |
|---|---|---|
| PATENT NO. | : 8,117,108 B2 | Page 1 of 1 |
| APPLICATION NO. | : 11/449954 | |
| DATED | : February 14, 2012 | |
| INVENTOR(S) | : Ian P. Johnson | |

It is certified that error appears in the above-identified patent and that said Letters Patent is hereby corrected as shown below:

In the Claims:

Col. 9, line 27, claim 10, delete "weights" and insert -- weight --

Col. 10, line 57, claim 31, after "device" insert -- of --

Col. 12, line 18, claim 37, delete "weights" and insert -- weight --

Col. 12, line 20, claim 37, delete "weights" and insert -- weight --

Signed and Sealed this
Eighteenth Day of June, 2013

Teresa Stanek Rea
*Acting Director of the United States Patent and Trademark Office*